(12) United States Patent
Lee et al.

(10) Patent No.: US 7,031,270 B2
(45) Date of Patent: Apr. 18, 2006

(54) MASTER FOR BLUETOOTH COMMUNICATION AND METHOD FOR ESTABLISHING BEACON CHANNEL THEREOF

(75) Inventors: Tae-jin Lee, Suwon (KR); Woo-shik Kang, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 884 days.

(21) Appl. No.: 09/984,443

(22) Filed: Oct. 30, 2001

(65) Prior Publication Data

US 2002/0064134 A1    May 30, 2002

(30) Foreign Application Priority Data

Oct. 30, 2000    (KR) ............................. 2000-64086

(51) Int. Cl.
*H04B 7/00*     (2006.01)
*H04L 12/26*    (2006.01)

(52) U.S. Cl. ...................... 370/310; 370/252

(58) Field of Classification Search ............. 370/310, 370/252, 431
See application file for complete search history.

(56) References Cited

U.S. PATENT DOCUMENTS

| | | | |
|---|---|---|---|
| 6,366,622 B1 * | 4/2002 | Brown et al. | 375/322 |
| 2002/0151275 A1 * | 10/2002 | Trost et al. | 455/41 |
| 2003/0103487 A1 * | 6/2003 | Kim et al. | 370/350 |
| 2004/0198221 A1 * | 10/2004 | Bin et al. | 455/41.1 |
| 2004/0214527 A1 * | 10/2004 | Lim et al. | 455/41.2 |
| 2005/0201310 A1 * | 9/2005 | Fujioka | 370/310 |

FOREIGN PATENT DOCUMENTS

| | | |
|---|---|---|
| EP | 1 168 158 A2 | 1/2002 |
| WO | WO 99/37106 A1 | 7/1999 |
| WO | WO 00/36757 A3 | 6/2000 |
| WO | WO 01/61936 A2 | 8/2001 |

OTHER PUBLICATIONS

Kalia M. et al: "Efficient Policies for Increasing Capacity in Bluetooth: An Indoor Pico-Cellular Wireless System" VTC 2000-Spring. XP-000968001.

* cited by examiner

*Primary Examiner*—Ricky Ngo
*Assistant Examiner*—Feben Micael Haile
(74) *Attorney, Agent, or Firm*—Sughrue Mion, PLLC

(57) ABSTRACT

A master for a bluetooth communication and a method for establishing a beacon channel thereof. The master communicating with slaves includes a transmitting and receiving section for transmitting and receiving signals to and from the slaves, a state information obtaining section for obtaining state information from the transmitting and receiving section including the number of parked slaves and types of slaves which are Synchronous Connection Oriented, a park parameter calculating section for calculating park parameters from the state information obtaining section including the number of beacon slots for maintaining communication channels with the parked slaves, and slots per access window, and a controlling section for communicating with the slaves through the transmitting and receiving section according to the park parameters.

17 Claims, 7 Drawing Sheets

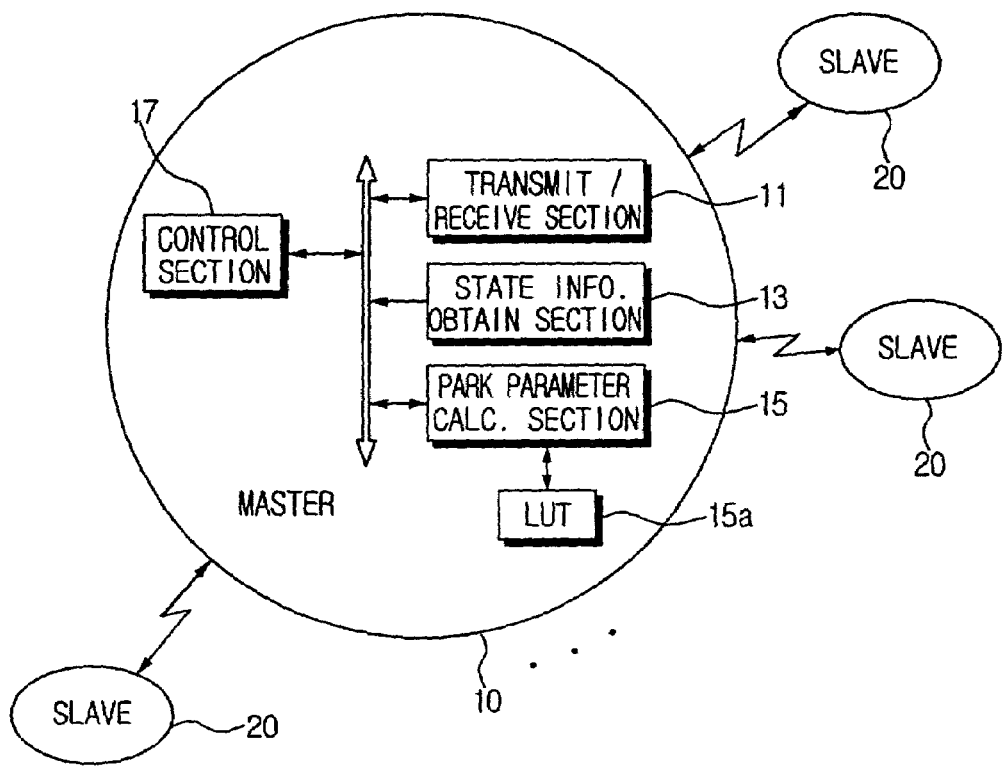

MASTER FOR BLUETOOTH COMMUNICATION AND METHOD FOR ESTABLISHING BEACON CHANNEL THEREOF

BACKGROUND OF THE INVENTION

1. Field of the Invention

The present invention relates to a master for bluetooth communication and method for establishing a beacon channel thereof, and more particularly, to a master for bluetooth communication and a variable duration beacon channel for controlling parked slaves.

2. Description of the Related Art

Generally, Bluetooth is a wireless communication protocol for transmitting data such as video data within a distance from 10 m to 100 m at a maximum speed of 1 Mbps.

Bluetooth units intercommunicating according to a bluetooth communication method are communicably connected through processes such as Inquiry, Inquiry Scan, Page, and Page Scan. Through these processes, a master and a slave are determined according to a role thereof performed in a network.

When rearranging a connection state of the bluetooth units, the time clock and frequency pattern of the bluetooth units need to be matched to one another.

Among the processes of connecting the bluetooth units, Inquiry is a repetitious frequency transmission of a master to a slave for matching the frequency pattern between the master and slave.

Inquiry Scan is the process of frequency detection and synchronization of the slave.

Page is a clock signal transmission from the master to the slave for matching the time clock between the master and slave. Page Scan is the process of clock signal detection and synchronization of the slave.

A piconet is constructed by the above processes in such a manner that at least one slave is connected to a master.

Conventional bluetooth communication enables intercommunication in a piconet by connecting up to seven slaves to a master in active mode. In order to connect a new slave to the piconet in which seven slaves are actively connected to a master, intermittent connection between the new slave and the master should be guaranteed.

The intermittent connection of the master and slave is called a park mode. By controlling the number of slaves in the park mode (hereinafter, referred to as parked slaves), the number of slaves to be connected to the piconet can be variably controlled.

For example, when a new slave is connected to a piconet in which seven slaves are actively connected to a master, an existing slave in the active mode needs to be parked.

The master establishes a beacon channel between transmission channels at regular intervals, allowing parked slaves to synchronize to the master or request switching to the active mode for their desired communication.

If the beacon channel duration is fixed by a master for maintaining connection with parked slaves, the network is inefficiently used, especially in the piconet environments where the number of parked slaves and the type of Synchronous Connection Oriented (SCO) slaves are varied. That is, when the duration of the beacon channel is fixed at a value longer than the minimum duration necessary for maintaining connection with the then parked slaves, the extra time can not be used for data transmission, resulting in inefficient use of the network.

SUMMARY OF THE INVENTION

Accordingly, the present invention has been made to solve the above-mentioned problem, and an object of the present invention is to provide a master for bluetooth communications and a method for establishing a beacon channel thereof, for efficiently transmitting data by controlling the beacon channel duration according to a connection state of the slaves.

To accomplish the above object, there is provided a master for bluetooth communications, communicating with slaves, comprising a transmitting and receiving section for transmitting and receiving signals to and from the slaves, a state information obtaining section for obtaining state information from the transmitting and receiving section including numbers of parked slaves and the types of slaves which are Synchronous Connection Oriented (SCO), a park parameter calculating section for calculating park parameters from the state information obtaining section, including the number of beacon slots which maintain communication channels with parked slaves, and the slots per access window (Aw), and a controlling section for communicating with the slaves through the transmitting and receiving section according to the park parameters.

It is preferable that the number of slots per access window (Aw) be determined by multiplying a weight factor, which is set according to the number of the parked slaves, by a first reference slot which is set according to types and numbers of Synchronous Connection Oriented (SCO) slaves.

It is also preferable that the weight factor be obtained by subtracting 1 from the number of the parked slaves, dividing the difference by 4, and adding 1 to the whole number portion of the quotient.

For example, when one or more SCO slaves and 4 parked slaves are connected to the master, the first reference slot value is obtained by the addition of four (4) slots, which are required for access by the four (4) parked slaves, to the Synchronous Connection Oriented (SCO) slots which are additionally allocated to the four (4) slots, corresponding to the types and numbers of Synchronous Connection Oriented (SCO) slaves.

The first reference slot value is recorded in a Look Up Table (LUT), which is used in a park parameter calculating section.

It is preferable that the number of beacon slots be obtained by doubling the number of calculated broadcast slots, and adding a spare slot thereto. The number of broadcast slots is calculated by adding a first constant value to a second value which depends upon the types and numbers of Synchronous Connection Oriented (SCO) slaves.

The first constant value is calculated by multiplying the number of broadcast types by the number of broadcast repetitions, regardless of the types and numbers of the Synchronous Connection Oriented (SCO) slaves.

To accomplish the above object, a method for establishing a beacon channel for maintaining communication channels between a master and parked slaves, comprises the steps of: i) obtaining connection state information including the number of parked slaves, obtained from communication with the slaves, and the type and number of slaves which are Synchronous Connection Oriented (SCO), ii) calculating park parameters from the state information obtained in step i) including the number of beacon slots and slots per access window (Aw) to be applied to the beacon channel for maintaining communication with parked slaves, and iii) establishing communication channels with the slaves according to the calculated park parameters.

BRIEF DESCRIPTION OF THE DRAWINGS

The above object and other features of the present invention will become more apparent with reference to the accompanying drawings, in which FIG. 1 is a block diagram showing a master according to the present invention;

FIG. 2 is a Look Up Table (LUT) of FIG. 1;

DETAILED DESCRIPTION OF THE PREFERRED EMBODIMENT

Figure 3:
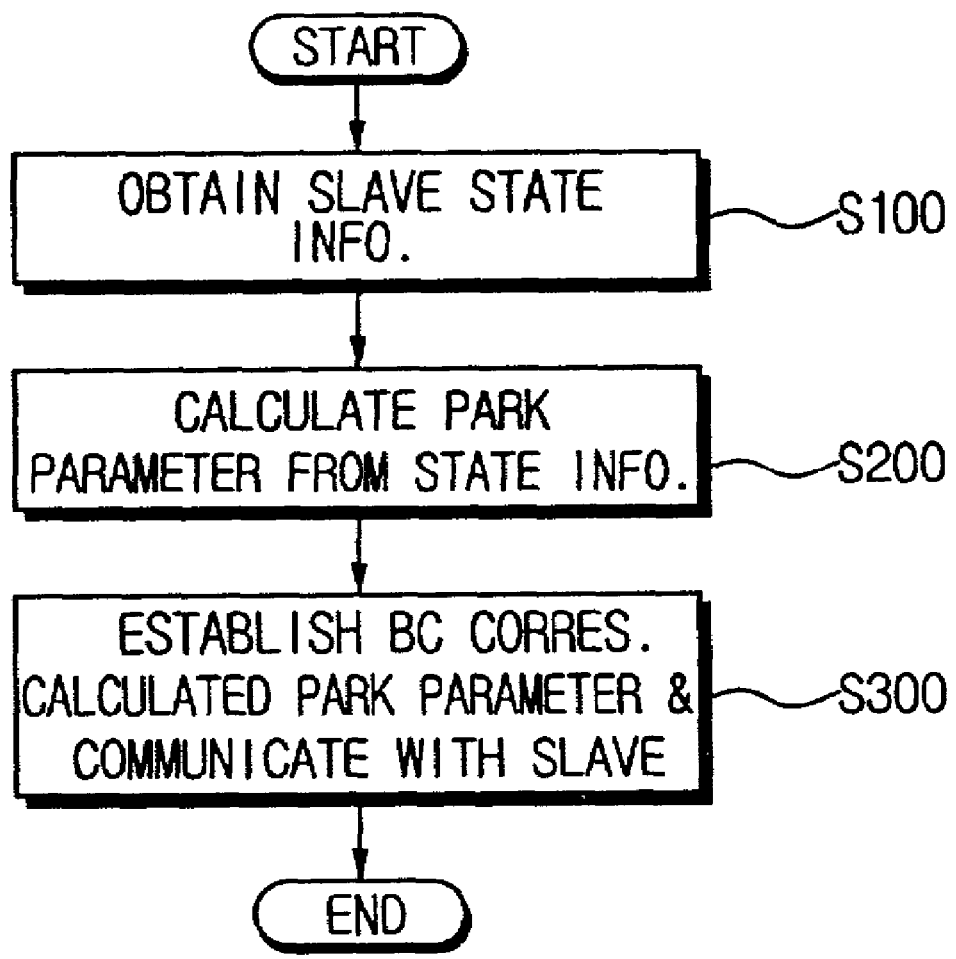
FIG. 3 is a flow chart showing the steps of establishing beacon channel according to the present invention.

Hereinafter, a master for bluetooth communications and a method for establishing a beacon channel according to the present invention will be described in greater detail with reference to the accompanying drawings.

FIG. 1 is a block diagram showing a master according to the present invention.

Referring to FIG. 1, the master 10 includes a transmitting/receiving section 11, a state information obtaining section 13, a park parameter calculating section 15, and a controlling section 17.

The transmitting/receiving section 11 transmits and receives signals to and from slaves 20.

The state information obtaining section 13 obtains state information from the received signals, including the number of parked slaves 20, and types of Synchronous Connection Oriented (SCO) slaves 20. Here, examples of the types of SCO slaves 20 are HV1, HV2, and HV3. SCO slaves support continuous transmission of data such as voice signals. The numbers 1, 2 and 3 following HV are synchronous connection intervals. For the HV3 type, for example, the master 10 allocates a SCO slot in every third broadcast slot.

The park parameter calculating section 15 calculates park parameters from the state information of the state information obtaining section 13, including the number of beacon slots for synchronization, the number of unit access windows (Tacc) per access window (Aw), and the number of slots per unit access window (Tacc). The park parameters are applied in establishing a beacon channel suitable for maintaining communications with then-parked slaves 20. Reference numeral 15a is a Look Up Table (LUT) in which reference values for calculating park parameters corresponding to the state information are stored. One example of the LUT is shown in FIG. 2.

The controlling section 17 controls each section of the master 10, establishes a beacon channel according to the park parameters from the park parameter calculating section 15, and communicates with the slaves 20 through the transmitting/receiving section 11.

The method for establishing the beacon channel as constructed above will be described referring to FIG. 3.

First, the master 10 obtains state information of the slaves 20 (Step S100). Here, the state information includes the number of parked slaves, and the number and types of SCO slaves.

Next, the master 10 calculates park parameters from the state information, for establishing sufficient communications channels with the parked slaves and the SCO slaves (Step S200).

Then, the master 10 establishes a beacon channel corresponding to the calculated park parameters, and communicates with the slaves (Step S300).

The master 10 repetitiously establishes communication channels within the beacon channel and a data transmission channel, and determines parameters of the next beacon channel to be established, according to the state information obtained via the currently established beacon channel and data transmission channel.

Hereinafter, an example of the calculation of park parameters according to the present invention will be described in detail by referring to FIGS. 4 through 9.

Figure 5:
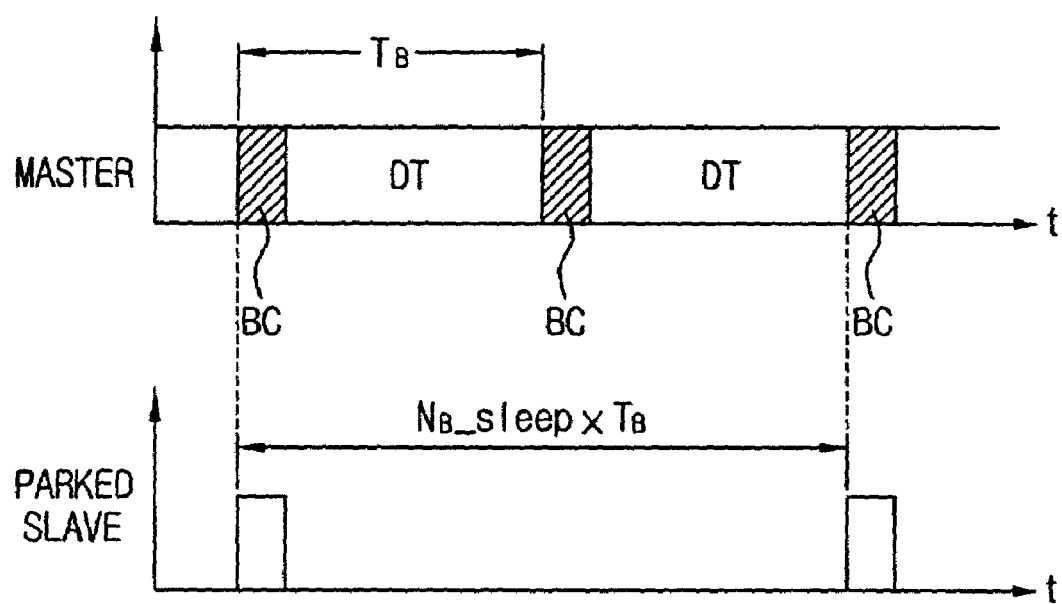
FIG. 5 is a timing diagram explaining a method for establishing channels between a master and parked slaves according to the present invention.

As shown in FIG. 5, the master 10 establishes a beacon channel (BC) and a data transmission channel (DT) as a unit cycle (TB), for communicating with the slaves or allowing the slaves to synchronize to the master 10. Here, the duration of the BC is variable, and is based on the park parameters obtained according to the present invention.

The parked slaves synchronize to the master 10 during the BC within a maximum wakeup period of the parked slave (2TB=NB_sleep*TB of FIG. 5), and request switching to an unpark, i.e., to an active mode for communicating with the master 10.

The BC includes a synchronous section (Dacc, FIG. 6) for enabling parked slaves to synchronize to the master while being synchronous with the SCO slaves, and an access window (Aw) section for allowing access by slaves. The park parameters include the number of slots to be allocated to the synchronous section (Dacc) and the access window (Aw) section.

Figure 6:
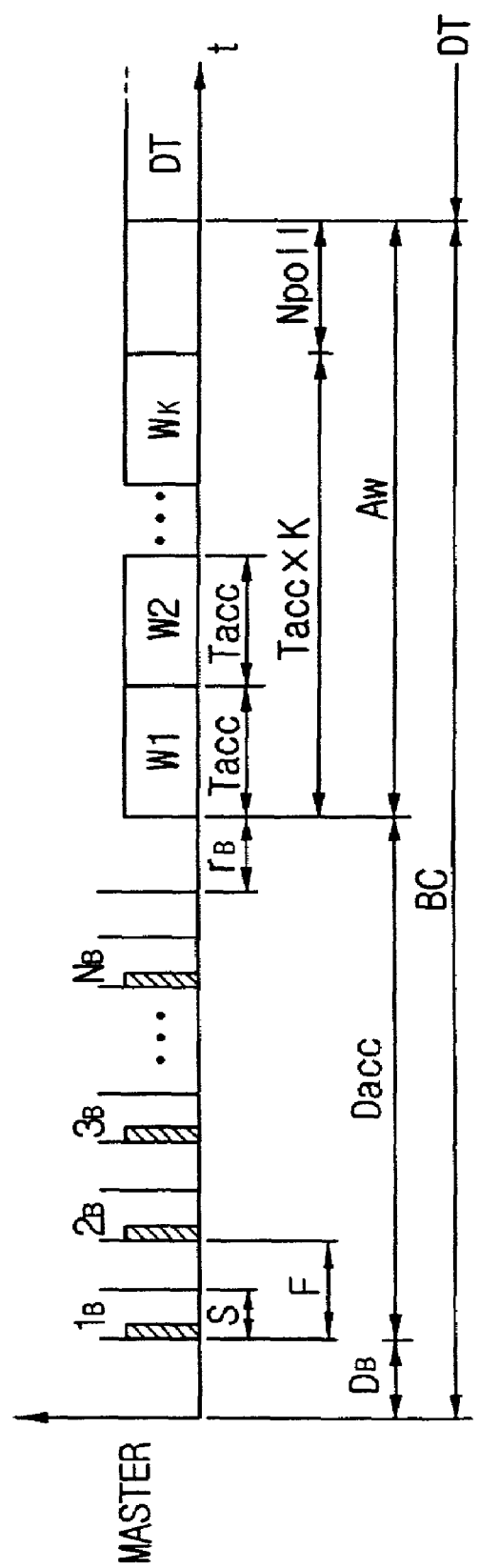
FIG. 6 is a timing diagram showing park parameters applied to a beacon channel of FIG. 5.

An example of the BC as constructed above is shown in FIG. 6.

Referring to FIG. 6, the BC includes the synchronous section (Dacc) and the access window (Aw) section. Reference characters DB is a delay section representing a delay period before the beginning of the synchronous section (Dacc). The delay section (DB) is a remainder from the division of the master clock into cycles TB.

The synchronous section (Dacc) includes a plurality of beacon slots which are allocated to broadcast slots 1B, 2B, 3B, ..., NB having an interval F and a duration S, a plurality of pause slots following the broadcast slots, and a spare slot section rB which includes a plurality of slots reserved for switching to the active mode when the slaves 20 receive unpark requests. The pause slots between the broadcast slots are reserved for the case of data reception from the slaves 20. It is preferable that the spare slot section rB includes thirty-two (32) slots. There are uniform intervals between the beacon slots, generally 625 μsec.

The number of broadcast slots in the synchronous section (Dacc) is determined according to the number of parked slaves and types of SCO slaves.

Figure 7:
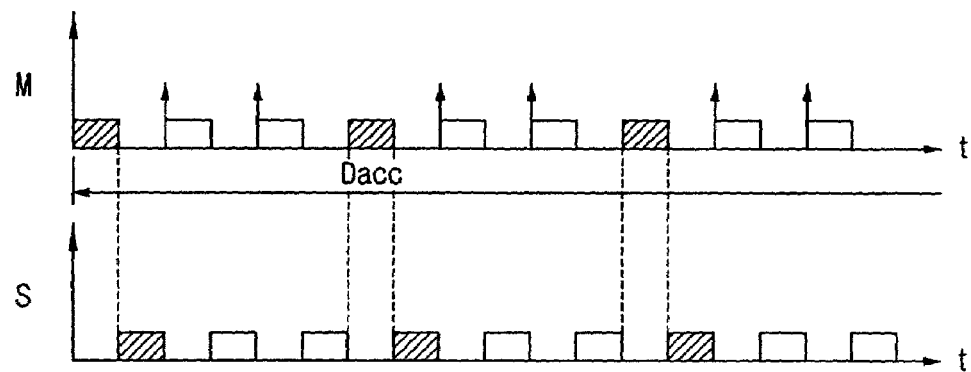
FIG. 7 is a timing diagram showing an example of communication between a master and a slave in a synchronous section (Dacc) of FIG. 6.

For example, as shown in FIG. 7, for a SCO slave of HV3 type, the master 10 allocates a SCO slot (shown hatched) in every third broadcast slot.

Referring to FIG. 7, the master 10 allocates one SCO slot (hatched square in FIG. 7) in every third broadcast slot of the synchronous section (Dacc), and broadcasts during the rest of broadcast slots (indicated with arrows on the line t) to allow the parked slaves to synchronize to the master. As noted previously, every second slot in the synchronous section (Dacc) is a broadcast slot. The slots following the broadcast slots are for receiving the signals transmitted from the slaves 20. Accordingly, when a slave 20 requests unpark to the master 10 in the access window (Aw), the master 10 sends the unpark command to the slave 20 which requested unpark. The slave 20 which receives the command from the master 10 is switched into the active mode.

The number of slots in the access window (Aw) is determined such that access by each of the parked slaves within an unit access windows (Tacc) is allowed. It is preferable that there be multiple unit access window (Tacc) (k) is allowing re-access of the slaves 20 in case of transmission errors in wireless communication.

In addition to the multiple number (k) of unit access windows (Tacc) for re-access, it is further preferable that a checking window (Npoll) be added for checking unpark commands received from the master 10. The checking window (Npoll) is reserved for receiving an unpark command from the master 10 when a slave 20 requests unpark in the last unit access window (Tacc) of the access window (Aw).

The access window (Aw) according to the preferred embodiment of the present invention includes a plurality of unit access windows (Wk) of duration Tacc, each having a plurality of slots for allowing re-access to the slaves that failed to transmit unpark requests, and the checking window (Npoll) for allowing the slaves to check for an unpark command from the master 10.

For example, for a SCO slave of HV3 type, two (2) slots of the six (6) slots within the unit access window are allocated for SCO, and two (2) slots among the remaining four (4) slots are allocated for broadcasting of the master 10. Then the remaining two (2) slots can be allocated for access by the parked slaves, respectively. The parked slaves can access the master 10 after receiving a broadcast message from the master 10. Half slots (312.5 µsec) are used for this purpose, as indicated in the lower half of FIG. 8. When using an SCO slave of the HV3 type, four (4) slots of the six (6) slots can thus be used for communication between the (4) parked slaves and the master 10. Thus, with a SCO slave of HV3 type and four (4) parked slaves, the unit access window (Tacc) is established with six slots. This example is shown in FIG. 8.

Figure 8:
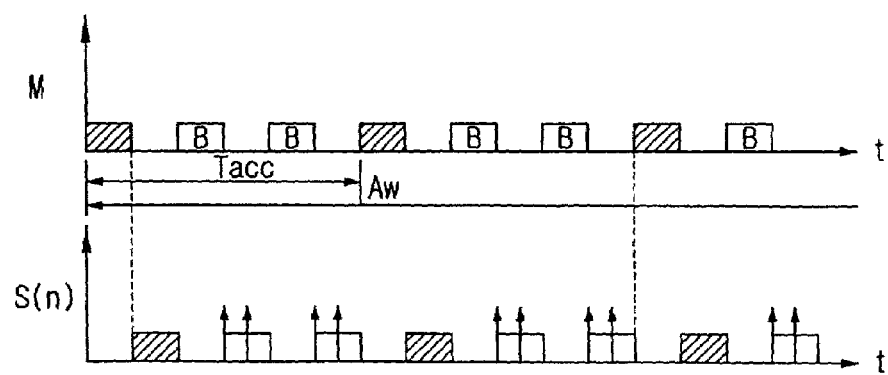
FIG. 8 is a timing diagram showing an example of communication between a master and a slave in an access window (Aw) section of FIG. 6.

Referring to FIG. 8, among the slots established by the master 10, the hatched slots are allocated for communications with the HV3 type SCO slaves. The slaves 20 can get access between each broadcast slot B of the master 10 in the half slots which are indicated with arrows. Accordingly, four (4) parked slaves can obtain access in a unit access window (Tacc) of six (6) slots.

Figure 9:
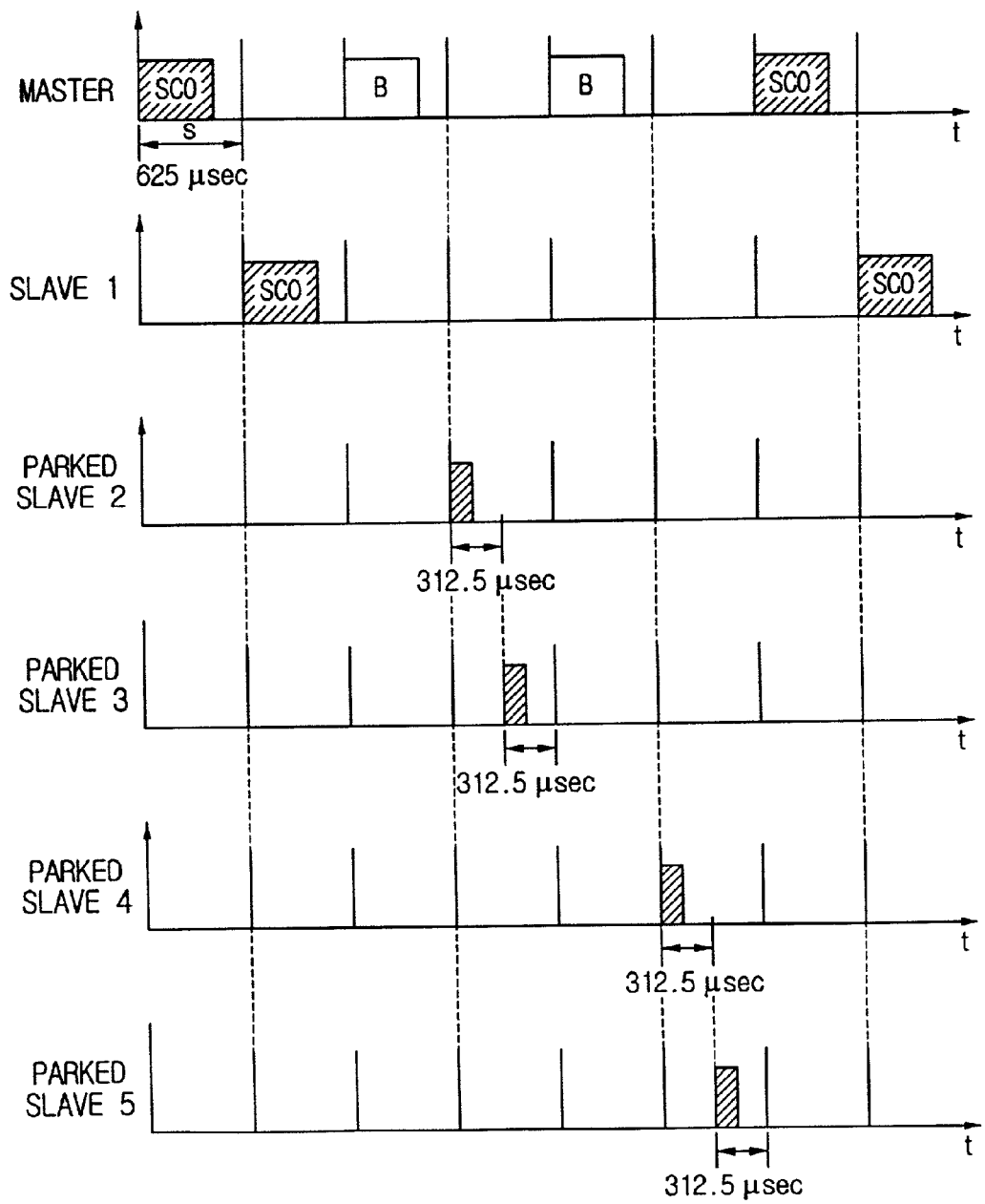
FIG. 9 is a detailed timing diagram showing an example of operation between a master and slaves of FIG. 8.

Referring to FIG. 9, the master 10 allocates a SCO broadcast slot in every sixth slot for maintaining synchronization with a SCO slave 1 of HV3 type. The SCO slave 1 sends its SCO response to the master 10 in the next slot. Among six (6) slots in the access window (Aw), two (2) slots are thus allocated for SCO, and the master 10 transmits its broadcast message once every second slot for the rest of the four (4) slots. The parked slaves request unpark to the master 10 in a slot between broadcast slots B. Here, four (4) parked slaves are connected to the master 10 in the unit access window (Tacc).

As shown in FIG. 9, after the first broadcast slot B, the slot of the parked slaves 2 and 3 is divided into two half slots, and the parked slaves 2 and 3 access the master 10 in the respective half slots. The slot between the second broadcast slot and the following SCO slot is also divided into two half slots, and the parked slaves 4 and 5 access the master 10 in the respective half slots.

Hereinafter, the calculation of park parameters of the number of slots of the BC according to the number of parked slaves and types of SCO slaves, is described in detail with reference to FIG. 4.

If the park parameters are applied based on frequently-changing numbers of parked slaves, frequent calculations are required. Thus, an identical weight factor is applied in this preferred embodiment when the park parameters are within a certain range.

Figure 4:
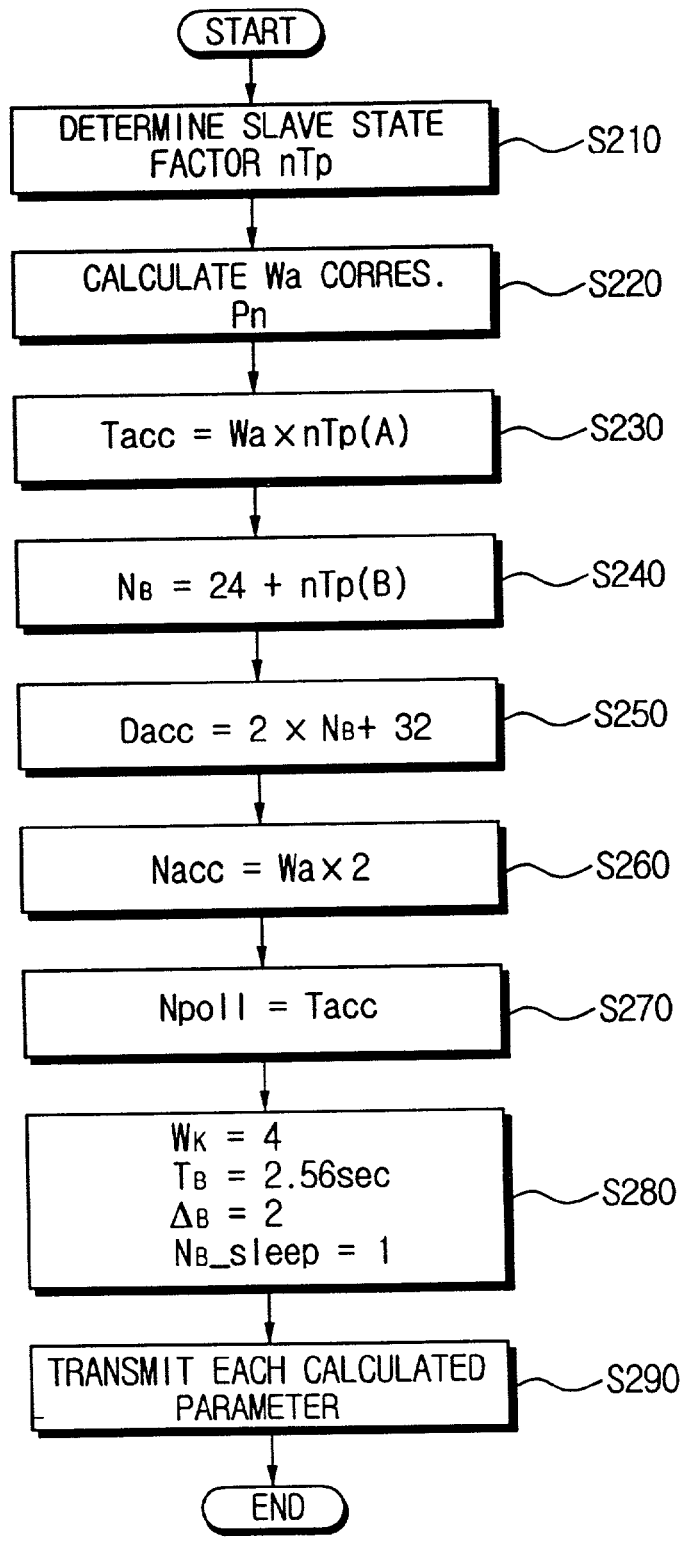
FIG. 4 is a flow chart showing the steps of obtaining park parameters according to the preferred embodiment of the present invention.

First, a connection state factor (nTp) of the slave 20 is determined by the state information (Step S210 in FIG. 4). Here, the connection state factor (nTp) is a parameter used in determining the BC and slots per access window (Aw) according to the state information. In this preferred embodiment of the present invention, the LUT 15a indicates reference values used in calculating parameters according to the numbers and types of SCO slaves.

Referring to FIG. 2, the factor for the numbers and types of SCO slaves is indicated as nTp. Among the variables, n is the number, and Tp is the type among HV1, HV2 and HV3.

Column A is the number of slots to be applied per access window (Aw) according to the connection state factor. Column B contains reference values in calculating the number of BC in the synchronous section (Dacc).

Next, a weight factor (Wa) corresponding to the number of parked slaves (Pn) is calculated (Step S220).

It is preferable that the weight factor (Wa) is calculated by the following formulas.

First, as shown in Formula 1, a constant 1 is subtracted from Pn which is obtained from the state information.

$$\text{temp1} = Pn - 1 \quad \text{[Formula 1]}$$

Next, as shown in Formula 2, temp1, is divided by 4, obtaining the whole-number portion, temp2, and the remainder r.

$$\text{temp1}/4 = \text{temp2} + r \quad \text{[Formula 2]}$$

Then, in Formula 3, a constant 1 is added to temp2, and the weight factor (Wa) is calculated.

$$Wa = \text{temp2} + 1 \quad \text{[Formula 3]}$$

According to the Formulas 1, 2 and 3, the weight factor (Wa) is 1 when the numbers of parked slaves are one (1) to four (4), and the weight factor (Wa) is 2 when the numbers of parked slaves are five (5) to eight (8).

The next step is to calculate the number of slots in the unit access window (Tacc) by multiplying the weight factor (Wa) by Column A of LUT 15a corresponding to the connection state factor according to the types and numbers of SCO slaves nTp (Step S230). For example, when the number of parked slaves are four (4) while the SCO slave state is 1HV3, the number of slots of the access window (Aw) is six (6).

Here, a first reference slot number is calculated by adding the four (4) slots which are required for access of four (4) parked slaves, to the number of SCO slots to be additionally allocated corresponding to the number and types of SCO slaves. Column A, the first reference slot number, is determined in such a manner that SCO communication can be maintained, and for the maximum four (4) parked slaves corresponding to weight factor (Wa) 1, at least one access by each parked slave is guaranteed.

Next, the number of broadcast slots of the master (NB) within the BC in the synchronous section (Dacc) is calculated by adding a first constant value to the Column B, (a second reference slot number, corresponding to the SCO slaves nTp (Step S240)).

The first constant value is calculated not by types and numbers of SCO slaves but by multiplying the number of broadcast types by the number of broadcast repetitions.

The first constant value is set so as to allocate three (3) broadcast slots to variable parameter information, a broadcast message to be transmitted to the parked slaves, and a broadcast message of unpark request of the parked slaves, respectively.

Three (3) broadcast types are considered, respectively, when altering parameters of the BC, sending a broadcast message to the parked slaves, and unparking one or more parked slaves. It is preferable that three (3) slots are required for allocating broadcast slots according to the broadcast types. It is also preferable that SCO slots repeatedly broadcast the identical message in case of transmission errors between the master 10 and the slaves 20. In this preferred embodiment, the same message broadcast is repeated eight (8) times for each of the three (3) broadcast types, and twenty-four (24) broadcasting slots are thus required. Twenty-four (24) slots are thus allocated as the first constant value regardless of the SCO state.

Meanwhile, the values in Column B (i.e., the second reference slot number) are set according to the type and number of SCO slaves. Several values are given in FIG. 2 for different types and combinations of such slaves.

When the first constant value is determined to be twenty-four (24), additional SCO slots are needed according to the type and numbers of SCO slaves, for generating twenty-four (24) slots of broadcasting message. For example, as shown in FIG. 2, for one slave of HV3 type, twelve (12) broadcast slots are allocated among twenty-four (24) slots of broadcasting message for total SCO of twenty-four (24) slots.

Next, the number of beacon slots in the synchronous section (Dacc) is calculated (Step S250). The number of beacon slots in the synchronous section (Dacc) is twice the number of broadcast slots (NB), plus the number of slots of the spare slot section (rB). Here, the number of broadcast slots (NB) is doubled to account for the pause slots. The number of slots of the spare slot section (rB) is thirty-two (32).

Then, other parameters are calculated, as shown in FIG. 4.

Since half slots are used for accessing parked slaves to the master 10, access to the master 10 by the parked slaves (Nacc) is possible. That is, one parked slave can access during a half slot of the slot allocated by the master 10, while the master 10 can process two (2) parked slaves during one slot. Accordingly, two (2) slots are set for the access of four (4) parked slaves (Step S260).

The number of slots per unit access window (Tacc) is also applied to the check window (Npoll) for checking for unpark request messages (Step S270).

Then, the rest of parameters are set or calculated. The unit access window (Tacc) (Wk) is four (4), allowing additional access for the slaves which failed to access in the first unit Aw. Frequency of the BC and data transmission channel (TB) is set at 2.56 seconds. Intervals ΔB of the broadcast slots are set to two (2), and the maximum wake-up period is 1TB (Step S280).

After the calculation of all parameters for establishing the BC, the calculated parameters are transmitted to the controlling section 17 (Step S290).

The controlling section 17 transmits the received parameter information to the slaves 20, and establishes corresponding BC as shown in FIG. 6.

In the master for bluetooth communication and method for establishing the beacon channel thereof according to the present invention, the BC is adjusted without causing overlapping of the BC according to the types of SCO slaves and the numbers of parked slaves, efficiently maintaining communication channels between the master 10 and the slaves 20.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A master communicating with slaves, comprising:
   transmitting and receiving means for transmitting and receiving signals to and from the slaves;
   state information obtaining means for obtaining state information from the transmitting and receiving means, the state information including numbers of parked slaves and types of slaves which are Synchronous Connection Oriented;
   park parameter calculating means for calculating park parameters based on the state information, the park parameters including a number of slots of a synchronous section of a beacon channel which maintains connection with the parked slaves, and a number of slots per unit access window of an access window section of the beacon channel; and
   controlling means establishing the beacon channel for communicating with the slaves through the transmitting and receiving means, wherein the controlling means controls a variable duration of the beacon channel according to the park parameters.

2. The master as claimed in claim 1, wherein the number of slots per access window is determined by multiplying a weight factor which is set according to the number of the parked slaves, by a first reference slot value which is set according to types and numbers of Synchronous Connection Oriented slaves.

3. The master as claimed in claim 2, wherein the weight factor is obtained by subtracting 1 from the number of the parked slaves, dividing the subtracted value by 4, and adding 1 to the whole number portion of the divided value.

4. The master as claimed in claim 3, wherein the first reference slot value is obtained by the addition of a number of slots which are required for access to then-parked slaves, to a number of synchronous slots which are additionally allocated corresponding to the types and numbers of Synchronous Connection Oriented slaves.

5. The master as claimed in claim 4, wherein the first reference slot value is recorded in a Look Up Table, which is used in the park parameter calculating means.

6. The master as claimed in claim 1, wherein the number of slots of the synchronous section is obtained by doubling a number of broadcast slots, whose number depends upon at least a first constant value and a second value, which is set according to the types and numbers of Synchronous Connection Oriented slaves, and by adding a number of slots of a spare slot section thereto.

7. The master as claimed in claim 6, wherein the first constant value is calculated by multiplying a broadcast repetition value by a broadcast type number, regardless of types and numbers of the Synchronous Connection Oriented slaves.

8. The master as claimed in claim 6, wherein said broadcast repetition number is eight (8) and said broadcast type number is three (3), corresponding to: (a) parameter altering information for the beacon slot, (b) broadcast messages transmitted to the parked slaves, and (c) unpark messages requested by the parked slaves.

9. The master as claimed in claim 6, wherein the spare slot section includes thirty-two (32) slots, which are used for the unparked slaves to check information on whether there is a new Synchronous Connection from the master.

10. A method for establishing a beacon channel for maintaining communication channels between a master and parked slaves, comprising:
   i) obtaining connection state information including a number of parked slaves obtained from communication with the slaves, and types of slaves which are Synchronous Connection Oriented;
   ii) calculating park parameters from the state information, the park parameters including a number of slots of a synchronous section of a beacon channel which maintains connection with the parked slaves, and a number of slots per unit access window of an access window section of the beacon channel; and
   iii) establishing the beacon channel for communicating with the slaves, wherein a variable duration of the beacon channel in control according to the park parameters.

11. The method as claimed in claim 10, wherein the calculating the park parameters includes calculating the number of the slots per unit access window by multiplying a weight factor according to the number of the parked slaves by a first reference slot value set according to the types and numbers of SCO slaves.

12. The method as claimed in claim 11, wherein the weight factor is calculated by subtracting 1 from the number of the parked slaves, dividing the subtracted value by 4, and adding 1 to the whole number portion of the quotient portion.

13. The method as claimed in claim 12, wherein the first reference slot value is obtained by the addition of a number of slots which are required for access to then-parked slaves, to a number of synchronous slots which are additionally allocated corresponding to the types and numbers of Synchronous Connection Oriented slaves.

14. The method as claimed in claim 10, wherein the number of the slots of the synchronous window is obtained by doubling a number of broadcast slots, whose number depends upon at least a first constant value and a second value, which is set according to the types and numbers of Synchronous Connection Oriented slaves, and by adding a number of slots of a spare slot section thereto.

15. The method as claimed in claim 14, wherein the first constant value is calculated by multiplying a broadcast repetition value by a broadcast type number, regardless of types and numbers of the Synchronous Connection Oriented slaves.

16. The method as claimed in claim 15, wherein said broadcast repetition number is eight (8) and said broadcast type number is three (3), corresponding to: (a) parameter altering information for the beacon slot, (b) broadcast messages transmitted to the parked slaves, and (c) unpark messages requested by the parked slaves.

17. The method as claimed in claim 14, wherein the number of slots in said spare slot is thirty-two (32).

* * * * *